US009781886B1

(12) United States Patent
Wangsgaard (10) Patent No.: US 9,781,886 B1
(45) Date of Patent: Oct. 10, 2017

(54) HAND-SECURABLE SPRINKLER FITTING (71) Applicant: Orbit Irrigation Products, Inc., North Salt Lake, UT (US)

(72) Inventor: Eric Tres Wangsgaard, Salt Lake City, UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 235 days.

(21) Appl. No.: 14/577,895

(22) Filed: Dec. 19, 2014

(51) Int. Cl.
*F16J 15/00* (2006.01)
*A01G 25/16* (2006.01)
*F16L 19/025* (2006.01)
*F16L 47/28* (2006.01)

(52) U.S. Cl.
CPC ............ *A01G 25/16* (2013.01); *F16L 19/025* (2013.01); *F16L 47/28* (2013.01); *F16L 47/285* (2013.01)

(58) Field of Classification Search
USPC ..................................................... 285/81, 92
See application file for complete search history.

(56) References Cited

U.S. PATENT DOCUMENTS

| 227,170 | A | 5/1880 | Lechner |
| 744,788 | A | 11/1903 | Noble et al. |
| 2,433,304 | A | 12/1947 | Stream |
| 3,083,914 | A | 4/1963 | Smith et al. |
| 4,630,635 | A | 12/1986 | Bernstein et al. |
| 4,927,192 | A | 5/1990 | Ungchusri et al. |
| 5,348,349 | A | 9/1994 | Sloane |
| 5,376,015 | A | 12/1994 | Fuchs et al. |
| 5,433,551 | A | 7/1995 | Gordon |
| 5,746,454 | A * | 5/1998 | Webb ..................... F16L 39/005 285/123.12 |
| 5,931,508 | A * | 8/1999 | Spriegel ................ F16L 19/005 285/247 |
| 5,957,716 | A * | 9/1999 | Buckley ................ H01R 13/622 285/92 |
| 6,142,535 | A * | 11/2000 | Nishio .................. F16L 19/005 285/331 |
| 6,293,595 | B1 | 9/2001 | Marc et al. |
| 6,334,632 | B1 * | 1/2002 | Nishio .................... F16L 47/04 285/331 |
| 6,688,651 | B2 * | 2/2004 | Min-cheol ............ F16L 19/005 285/92 |

(Continued)

FOREIGN PATENT DOCUMENTS

WO 2004106794 A2 12/2004

*Primary Examiner* — Aaron Dunwoody
(74) *Attorney, Agent, or Firm* — Austin Rapp (57) ABSTRACT

A coupling for an irrigation system may have a first member and a second member, each of which has threads that engage a threaded fitting of an adjacent component. The first member may have a shank and a flange that has a greater exterior dimension than the shank. The flange may have a first locking extension. The second member may have a bore that receives the shank such that the second member is slidable along the base member between a locked configuration in which rotation of the second member about the centerline induces rotation of the base member about the centerline, and an unlocked configuration, in which the second member is rotatable about the centerline independently of rotation of the base member. The second member may further have a first recess that receives the first locking extension in the locked configuration.

20 Claims, 6 Drawing Sheets (56) References Cited

U.S. PATENT DOCUMENTS

| | | |
|---|---|---|
| 7,021,672 B2 | 4/2006 | Ericksen et al. |
| 7,051,763 B2 | 5/2006 | Heren |
| 7,216,672 B1 | 5/2007 | Chen |
| 7,243,684 B1 | 7/2007 | Chen |
| 7,314,237 B2 | 1/2008 | Warden |
| 7,810,851 B2 | 10/2010 | Wangsgaard |
| 7,931,307 B2 * | 4/2011 | Fujii ................... F16L 19/028 285/123.15 |
| 8,074,963 B2 | 12/2011 | Iacopetta |
| 8,240,715 B2 * | 8/2012 | Itou ....................... F16L 19/005 285/354 |
| 8,534,467 B2 | 9/2013 | Haas et al. |
| 8,602,460 B2 | 12/2013 | Heuwinkel |
| 9,073,078 B2 * | 7/2015 | Imagawa ............... B05B 15/065 |
| 9,151,427 B2 * | 10/2015 | Imanishi ................ F16L 19/028 |
| 9,371,947 B2 * | 6/2016 | Choi ...................... F16L 19/065 |
| 2001/0013700 A1 | 8/2001 | Mintz et al. |
| 2002/0070544 A1 * | 6/2002 | Kingsford ............... F16L 15/00 285/81 |
| 2002/0125716 A1 | 9/2002 | Rochelle |
| 2002/0163194 A1 | 11/2002 | Mintz et al. |
| 2004/0036292 A1 | 2/2004 | Austin |
| 2004/0090067 A1 | 5/2004 | Pridham |
| 2006/0033333 A1 | 2/2006 | Pickney |
| 2006/0151994 A1 * | 7/2006 | Marc ..................... F16L 19/005 285/92 |
| 2007/0052234 A1 | 3/2007 | Breay |
| 2008/0012326 A1 | 1/2008 | Braathen et al. |
| 2009/0160186 A1 | 6/2009 | McGuire |
| 2011/0254261 A1 | 10/2011 | Heuwinkel |

* cited by examiner

HAND-SECURABLE SPRINKLER FITTING

TECHNICAL FIELD

The present invention relates generally to irrigation systems and methods. More specifically, the present invention relates to coupling systems and methods that can be tightened and/or sealed by hand.

BACKGROUND

There are many types of irrigation systems known in the art. These irrigation systems generally include irrigation devices, which may be sprinklers, drip emitters, etc. These irrigation devices may be used to distribute water to an area, such as a lawn or a garden, so that grass and other plants may grow. Of course, in order to provide water to the irrigation devices, the irrigation devices are connected to a system of pipes, which are, in turn, connected to a water source. Water is generally delivered to the irrigation devices via the system of pipes. Generally, this system of irrigation devices and pipes are referred to as a "sprinkler system."

As is known in the art, sprinkler systems may include a "valve box" that contains one or more valves. The individual sprinklers will be divided into "zones" or lines. Each zone of sprinklers may be attached to a separate valve. A single sprinkler system may contain multiple valves. The valves allow the user to turn on and off a particular zone of sprinklers, as desired. When the valve is closed, the valve blocks water flow. However, when the valve is opened, water flows through the piping to irrigate a particular area/zone of the property. Thus, individual zones or areas of the yard may be watered differently (i.e., watered at different times, receive different amounts of water, etc.).

Couplings may be used to attach the system of pipes to one or more valves. Improved couplings that are easy to install and still provide a watertight seal are thus desirable.

SUMMARY

Embodiments of the disclosed subject matter are provided below for illustrative purposes and are in no way limiting of the claimed subject matter.

A manifold system may comprise a pipe section including a plurality of threaded manifold fittings and a plurality of couplings. Each of the couplings may have a centerline and may define a fluid flow passageway.

Each of the plurality of couplings may comprise: a base member shaped to define a base member distal end comprising base member threads; a base member proximal end; a shank intermediate the base member distal end and the base member proximal end; and a flange intermediate the base member distal end and the shank.

The flange may have a greater exterior dimension than the shank. The flange may comprise: a flange proximal surface; a flange distal surface, the flange proximal surface being intermediate the shank and the flange distal surface, the flange distal surface being intermediate the flange proximal surface and the base member distal end; and a first locking extension that protrudes from the flange proximal surface.

Each coupling may further comprise a grip member shaped to define a bore sized to receive the shank such that the grip member is slidable along the shank of the base member between a locked configuration in which rotation of the grip member about the centerline induces rotation of the base member about the centerline, and an unlocked configuration, in which the grip member is rotatable about the centerline independently of rotation of the base member.

The grip member may further comprise a grip member proximal end comprising grip member threads configured to engage one of the plurality of threaded manifold fittings.

The grip member may also comprise a grip member distal end comprising a grip member distal surface. The grip member distal end may be disposed intermediate a grip member proximal end and the flange proximal surface when the shank is received within the bore. The grip member distal surface may be shaped to define a first recess that receives the first locking extension in the locked configuration and not in the unlocked configuration.

In one embodiment, for each of the plurality of couplings from the locked configuration, further motion of the grip member toward the base member distal end along the shank causes the grip member distal surface to contact the flange such that the flange obstructs further motion of the grip member toward the base member distal end. The flange may comprise a peripheral shape that is larger than the bore such that an entirety of the base member is unable to pass through the bore.

The manifold system may further comprise a plurality of valves. Each of the valves may comprise a first threaded valve fitting defining a fluid inlet. For each of the plurality of couplings, the base member threads may be configured to engage the first valve fitting of one of the plurality of valves. Each of the plurality of valves may further comprise a second threaded valve fitting defining a fluid outlet. For each of the plurality of couplings, the base member threads may be further configured to engage the second valve fitting of one of the plurality of valves.

The flange of each of the plurality of couplings comprises a polygonal peripheral shape, which may comprise a plurality of flat surfaces. The grip member of each of the plurality of couplings may be further shaped to define a knurled exterior surface to facilitate rotation of the grip member by hand.

The flange of each of the plurality of couplings may further comprise a second locking extension that protrudes from the flange proximal surface, and the grip member distal surface of each of the plurality of couplings may be further shaped to define a second recess and a plurality of additional recesses. The first locking extension and the second locking extension may each be insertable into any of the first recess, the second recess, and the plurality of additional recesses such that the grip member is movable along the shank into the locked configuration in at least three discrete orientations of the grip member relative to the base member.

The base member threads of each of the plurality of couplings may comprise male threads shaped to engage a female threaded fitting. Also, the grip member threads of each of the plurality of couplings may comprise female threads shaped to engage a male threaded fitting.

The base member proximal end of each of the plurality of couplings may comprise a base member abutment extending outward from the centerline. In addition, the bore of each of the plurality of couplings may comprise a grip member abutment extending toward the centerline. For each of the plurality of couplings, when the shank is received within the bore, the base member abutment may contact the grip member abutment in response to proximal motion of the grip member along the shank to restrict withdrawal of the shank from the bore. Further, for each of the plurality of couplings, at least one of the base member abutment and the grip member abutment may comprise a tapered leading end that facilitates passage of the base member abutment through the grip member abutment during distal motion of the grip member relative to the base member to insert the shank into the bore.

A method for assembling a coupling is also disclosed. The coupling for use with such a method may define a fluid passageway and have a centerline. The coupling may comprise a first member shaped to define a first member distal end comprising first member threads, a first member proximal end, a shank intermediate the first member proximal end and the first member distal end, and a flange having a greater exterior dimension than the shank. The flange may be intermediate the shank and the first member distal end. The flange may comprise a flange proximal surface and a flange distal surface with the flange proximal surface being intermediate the shank and the flange distal surface, and the flange distal surface being intermediate the flange proximal surface and the first member distal end. A first locking extension protrudes from the flange proximal surface. The coupling may comprise a second member shaped to define a bore sized to receive the shank and second member distal end comprising a second member distal surface and a second member proximal end comprising second member threads. The distal second member surface may be shaped to define a first recess shaped to receive the first locking extension.

The method may comprise aligning the first member threads with a first threaded fitting.

The method may also comprise sliding the second member along the shank from an unlocked configuration in which the second member is rotatable about the centerline independently of rotation of the first member, to a locked configuration.

Sliding the second member to the locked configuration may comprise inserting the first locking extension into the first recess. In one embodiment, when the second member is in the locked configuration, applying pressure to the second member to move the second member closer to the flange does not disengage the second member from the locked configuration.

The method may also include, in the locked configuration, rotating the second member by hand.

The method may also involve, in response to rotation of the second member, rotating the first member via engagement of the first locking extension with the first recess to cause the first member threads to engage the first threaded fitting.

The method may further comprise aligning the second member with a second threaded fitting; sliding the second member along the shank from the locked configuration to the unlocked configuration; further rotating the second member by hand; and in response to further rotation of the second member, causing the second member threads to engage the second threaded fitting.

The method may also comprise: wherein the first threaded fitting is on a pipe section of a manifold system and the second threaded fitting defines a fluid inlet of a valve; wherein causing the first member threads to engage the first threaded fitting may comprise securing the first coupling to the pipe section; and wherein causing the second member threads to engage the second threaded fitting may comprise securing the first coupling to the valve.

Another embodiment of a coupling defining a fluid flow passageway and having a centerline is also disclosed. The coupling may comprise a first member shaped to define: a first member distal end comprising first member threads; a first member proximal end; a shank intermediate the first member distal end and the first member proximal end; and a flange intermediate the first member distal end and the shank. The flange may have a greater exterior dimension than the shank.

The flange may comprise: a flange proximal surface; a flange distal surface, the flange proximal surface being intermediate the shank and the flange distal surface, the flange distal surface being intermediate the flange proximal surface and the first member distal end; and a first locking extension or recess disposed on the flange proximal surface.

The coupling may also comprise a second member shaped to define a bore sized to receive the shank such that the second member is slidable along the shank of the first member between a locked configuration in which rotation of the second member about the centerline induces rotation of the first member about the centerline, and an unlocked configuration in which the second member is rotatable about the centerline independently of rotation of the first member.

The second member may further comprise a second member proximal end comprising second member threads configured to engage a threaded manifold fitting.

The second member may also comprise a second member distal end comprising a second member distal surface. The second member distal end may be disposed intermediate a second member proximal end and the flange proximal surface when the shank is received within the bore. The second member distal surface may be shaped to define a second locking extension or recess shaped to engage the first locking extension or recess in the locked configuration and not in the unlocked configuration.

In one embodiment, the flange may comprise a polygonal peripheral shape comprising a plurality of flat surfaces. The second member is further shaped to define a knurled exterior surface to facilitate rotation of the second member by hand.

The flange may further comprise a third locking extension or recess disposed on the flange proximal surface. The second member distal surface may be further shaped to define a fourth locking extension or recess that engages the third locking extension or recess in the locked configuration. The second member distal surface may be further shaped to define a plurality of additional locking extensions or recesses. The first locking extension or recess and the third locking extension or recess may be shaped to engage any of the second locking extension or recess, the fourth locking extension or recess or any of the plurality of additional locking extensions or recesses such that the second member is movable along the shank into the locked configuration in at least three discrete orientations of the second member relative to the first member.

The first member threads may comprise male threads shaped to engage a female threaded fitting.

The second member threads may comprise female threads shaped to engage a male threaded fitting.

The first member proximal end may comprise a first member abutment extending outward from the centerline. The bore may comprise a second member abutment extending toward the centerline. When the shank is received within the bore, the first member abutment contacts the second member abutment in response to proximal motion of the second member along the shank to restrict withdrawal of the shank from the bore.

At least one of the first member abutment and the second member abutment may comprise a tapered leading end that facilitates passage of the first member abutment through the second member abutment during distal motion of the second member relative to the first member to insert the shank into the bore.

The flange may be further shaped to define a knurled exterior surface to facilitate rotation of the second member by hand.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure and/or functionality in addition to, or other than, one or more of the aspects set forth herein based on information known to one of skill in the art.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The term "an embodiment," "an alternative embodiment" or "one embodiment" may refer to various configurations or embodiments of the disclosed apparatuses, systems or methods in the singular or plural form, rather than referring to a single, particular embodiment.

As used in this application, the term "adjacent" signifies next to or near.

Figure 1:
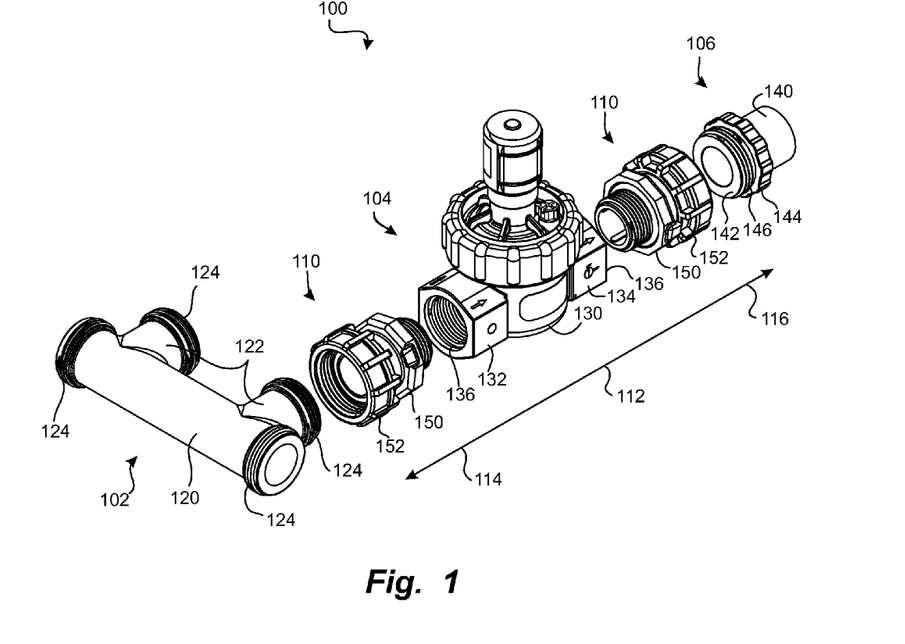
FIG. 1 is an exploded, perspective view of a manifold system according to one embodiment.

Referring to FIG. 1, an exploded, perspective view illustrates a manifold system 100, according to one embodiment. The manifold system 100 may be designed for use in irrigation systems in which water from a source, such as a subterranean main water line (not shown), is distributed over an area to be irrigated through multiple zones. The manifold system 100 may facilitate distribution of the irrigation water to various zones, which may be independently controllable.

As shown, the manifold system 100 may include various components, which may optionally include a pipe section 102, one or more valves 104, one or more conduits 106, and/or one or more couplings 110. The pipe section 102 may deliver irrigation water to the conduit 106 via the valve 104 when the valve 104 is in an open position; when the valve 104 is in a closed position, irrigation water flow to the conduit 106 may be obstructed by the valve 104. The couplings 110 may be used to secure the valve 104 to the pipe section 102 and to the conduit 106.

Only one valve 104 and one conduit 106 are shown in FIG. 1. However, the manifold system 100 may optionally include one or more additional valves 104 that selectively deliver irrigation water to one or more conduits 106. Each of the conduits 106 may lead to an irrigation zone, which may include one or more irrigation units, such as sprinkler heads, drip lines, bubblers, and/or the like. Through the use of the valves 104, irrigation water flow may be controlled for each zone, individually.

The combination of the coupling 110, valve 104 and conduit 106 may have a longitudinal dimension 112 as depicted in FIG. 1. Irrigation water may flow through the illustrated components (i.e., from the pipe section 102 through the couplings 110 and the valve 104 to the conduit 106) along the longitudinal dimension 112. The longitudinal dimension 112 may have a proximal direction 114 oriented toward the pipe section 102, and a distal direction 116 oriented toward the conduit 106.

The pipe section 102 may have any of a wide variety of shapes and sizes. The pipe section 102 may receive irrigation water from the irrigation water supply and may distribute the irrigation water to multiple zones as described above. Thus, the pipe section 102 may have a main tube 120 and a plurality of supply extensions 122. For example, the pipe section 102 may have two supply extensions 122, as shown in the exemplary embodiment of FIG. 1. The main tube 120 may receive the irrigation water, and each of the supply extensions 122 may convey the irrigation water to a zone via a corresponding set of a valve 104, a conduit 106, and two couplings 110, as shown.

If desired, the pipe section 102 may be part of a modular design such that multiple pipe sections 102 can be linked in series (not shown). Thus, multiple manifold systems 100 may be connected together. In some examples, this may be done by connecting the main tubes 120 of the pipe sections 102 of the manifold systems 100 end-to-end, so that the supply extensions 122 are parallel to each other. The first pipe section 102 may be connected to the irrigation water source at one end of its main tube 120 and to an adjacent pipe section at the other end of its main tube 120. An unused pipe section 102 may be capped at the far end of its main tube 120 with a cap or other plug.

The pipe section 102 may have a plurality of threaded manifold fittings 124, each of which connects the pipe section 102 to a different component. For example, the pipe section 102 may have two threaded manifold fittings 124 on the main tube 120, and a threaded manifold fitting 124 on each of the supply extensions 122. Optionally, each of the threaded manifold fittings 124 may have male threading that engages corresponding female threading in other components, such as the couplings 110.

Each of the valves 104 may be of a type that is electrically controlled. Thus, each valve 104 may use a solenoid or other electrically-operated actuation device to move the valve 104 to an opened state, in which irrigation water is able to flow through the valve 104, and a closed state, in which irrigation water flow through the valve 104 is blocked. Each valve 104 may use a variety of mechanical systems to accomplish the valve function; in some embodiments, each valve 104 may have a diaphragm that is movable by the actuator to control irrigation water flow.

Each of the valves 104 may have a main body 130, an inlet 132, and an outlet 134. From the pipe section 102, irrigation water may flow through the coupling 110 adjacent to the pipe section 102 into the main body 130 via the inlet 132. When the valve 104 is open, the irrigation water may also flow from the main body 130 to the conduit 106, via the outlet 134 and the coupling 110 adjacent to the conduit 106. The inlet 132 and the outlet 134 may each have a threaded valve fitting 136. If desired, each of the threaded valve fittings 136 may have female threading that engages corresponding male threading on other components, such as the couplings 110.

Each of the conduits 106 may be provided as part of the manifold system 100, or in the alternative, may be provided separately (for example, as part of an irrigation conduit system that supplies irrigation water to a zone). Each conduit 106 may, for example, have a main body 140 that conveys irrigation water to one or more other conduits and/or irrigation units, an inlet 142 that receives the irrigation water, and a flange 144 positioned between the main body 140 and the inlet 142. The flange 144 may be knurled in a manner that makes it easy for a user to rotate the conduit 106 to make a threaded connection between the conduit 106 and an adjacent component. The inlet 142 may have a threaded conduit fitting 146, which may have male threading that engages corresponding female threading in other components, such as the couplings 110.

As shown, multiple couplings 110 may be used to facilitate conveyance of irrigation water to each zone. For example, a coupling 110 may be secured to the pipe section 102 and the valve 104 to convey irrigation water from the pipe section 102 to the valve 104, and another coupling 110 may be secured to the valve 104 and the conduit 106 to convey irrigation water from the valve 104 to the conduit 106. These are merely exemplary uses for the couplings 110; in other embodiments, a coupling 110, according to the present disclosure, may be used to provide fluid communication between any two threaded members in irrigation systems, household culinary water systems, and/or any other fluid conveyance systems.

As shown, each of the couplings 110 may have a first member 150 and a second member 152 that is separate from the first member 150. The second member 152 may be coupled to the first member 150 in such a manner that the second member 152 is, in an unlocked configuration, freely rotatable relative to the first member 150, and is, in a locked configuration, substantially unable to rotate relative to the first member 150 (i.e., the first member 150 and the second member 152 rotate together). Furthermore, the second member 152 may have a limited range of motion, relative to the first member 150, in the longitudinal dimension 112. This longitudinal motion of the second member 152 relative to the first member 150 may move the coupling 110 between the locked configuration and the unlocked configuration. The manner in which this is accomplished will be shown and described in greater detail in connection with FIGS. 3-5.

Through the use of the couplings 110, assembly of the manifold system 100 may be greatly facilitated. According to one assembly method, the components illustrated in FIG. 1 may be assembled by first moving both of the couplings 110 to the locked configuration so that rotation of each second member 152 causes rotation of the adjoining first member 150. Then, the second members 152 may be gripped, for example, by hand and pressed against the inlet 132 and the outlet 134 of the valve 104 and rotated to rotate the first members 150 into threaded engagement with the threaded valve fittings 136 of the inlet 132 and the outlet 134 of the valve 104. This may secure the first members 150 of the couplings 110 to the valve 104.

Once the couplings 110 have been secured, via threaded engagement, to the valve 104, the couplings 110 may both be moved to the unlocked configuration to enable rotation of the second members 152 relative to the valve 104 and the first members 150. The second members 152 may then be pressed against the threaded manifold fitting 124 of the pipe section 102 and the threaded conduit fitting 146 of the conduit 106 and rotated. The second members 152 may be rotated until they are in complete threaded engagement with the threaded manifold fitting 124 of the pipe section 102 and the threaded conduit fitting 146 of the conduit 106. The pipe section 102 and the conduit 106 may then be secured to the valve 104 via the couplings 110. Thus, the manifold system 100 may be in a fully assembled condition.

Figure 2:
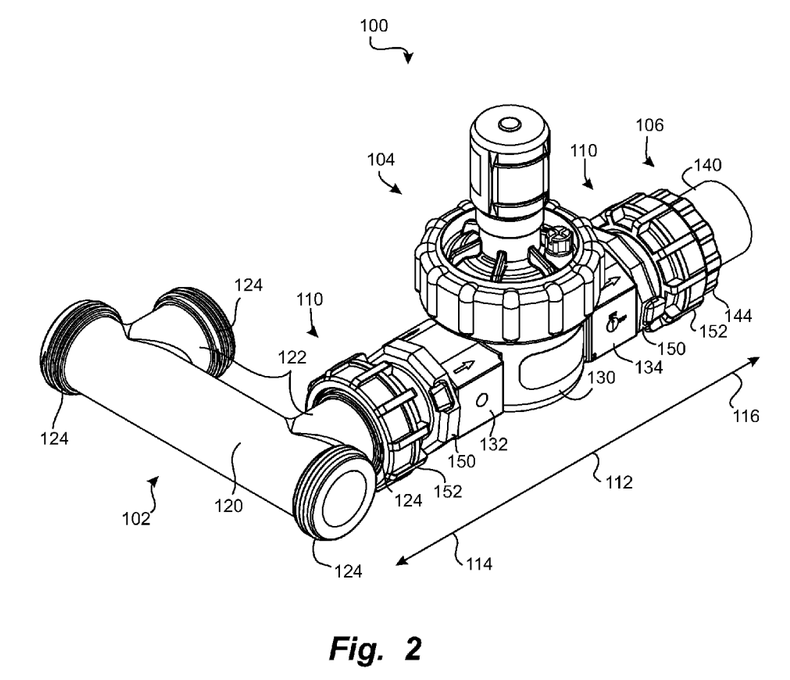
FIG. 2 is a perspective view of the manifold system of FIG. 1 in a fully assembled condition.

Referring to FIG. 2, a perspective view illustrates the manifold system 100 of FIG. 1 in a fully assembled condition. More specifically, the components illustrated in FIG. 1 are in a fully assembled condition; those of skill in the art will recognize that additional connections may be made, for example, by assembling another valve 104, conduit 106, and associated couplings 110 on the unoccupied supply extension 122 of the pipe section 102. Furthermore, the threaded manifold fittings 124 of the pipe section 102 may be connected to a water supply, one or more other pipe sections 102, and/or a cap, as described previously.

As mentioned previously, the couplings 110 may facilitate assembly of the manifold system 100 into the configuration shown in FIG. 2. The manifold system 100 may optionally be assembled without the need for tools, such as wrenches. Rather, the threaded connections referenced previously may be made by gripping and rotating the second members 152 of the couplings 110 by hand. It should be noted that the knurling on the outside of the second member 152 provides additional exterior/radial dimension (i.e., leverage) and enables gripping and rotating of the second member 152 by hand, such that rotation and tightening may occur without the use of a tool or wrench. The manner in which the couplings 110 provide this functionality will be shown and described in connection with FIGS. 3-5.

Figure 3:
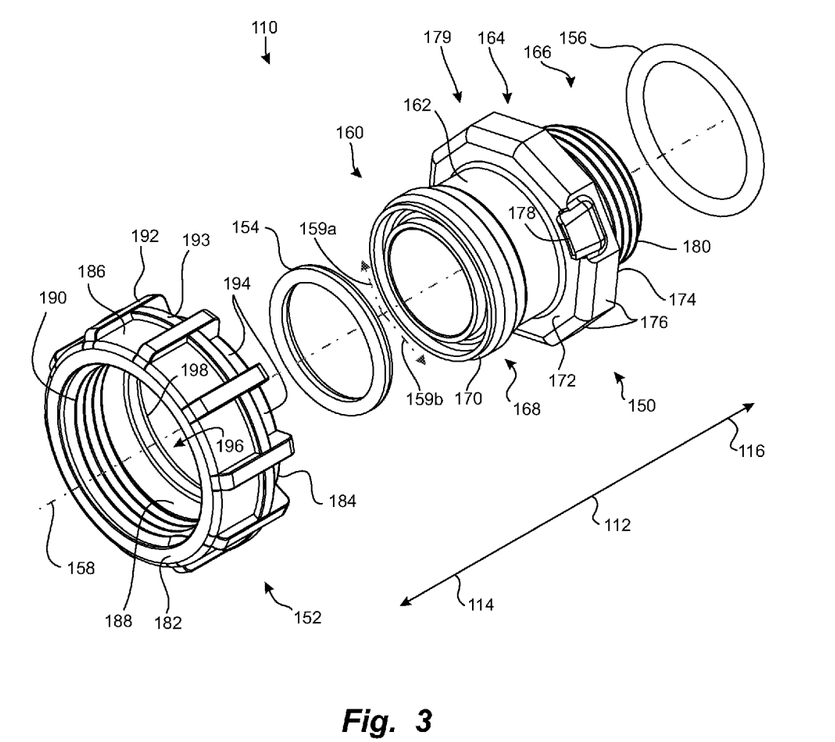
FIG. 3 is a side elevation, exploded perspective view of a coupling of the manifold system of FIG. 1.

Referring to FIG. 3, a side elevation, exploded perspective view illustrates a coupling 110 of the manifold system 100 of FIG. 1. As shown, the coupling 110 may include the first member 150 and the second member 152 referenced above. Additionally, the coupling 110 may include a proximal O-ring 154 and a distal O-ring 156 that help the coupling 110 to form seals with the adjacent components (i.e., the pipe section 102, the valve 104, and the conduit 106). The first member 150, the second member 152, the proximal O-ring 154, and the distal O-ring 156 may each have some degree of axial symmetry, and may each be centered on a centerline 158. As illustrated, the centerline 158 is linear. However, in alternative embodiments, the centerline 158 may be curved, for example, if the coupling 110, the first member 150 and/or the second member 152 are curved.

As shown, the first member 150 may have a first member proximal end 160, a shank 162, a flange 164, and a first member distal end 166. The first member proximal end 160 may receive the proximal O-ring 154 in a groove, as shown, and may be pressed axially against a threaded fitting, such as one of the threaded manifold fittings 124 of the pipe section 102 and/or the threaded conduit fitting 146 of the conduit 106. Pressure of the first member proximal end 160 against the corresponding threaded fitting may exert axial pressure on the proximal O-ring 154, causing the proximal O-ring 154 to deform (i.e., spread radially inward and outward) to form a seal that is substantially watertight.

The first member proximal end 160 may further have a first member abutment 168 that helps to retain the second member 152 on the first member 150. The first member abutment 168 may serve as a motion stop for the second member 152 such that the second member 152 is able to slide along the shank 162, between the flange 164 and the first member abutment 168. The first member abutment 168 may thus be slightly larger than the shank 162. The first member abutment 168 may have a tapered leading end 170 that facilitates assembly of the first member 150 and the second member 152 in a manner that will be set forth subsequently. The tapered leading end 170 may have a generally frustoconical shape that provides for a gradual increase in the diameter of the first member abutment 168 between the leading edge of the first member proximal end 160 and the full diameter of the first member abutment 168.

The shank 162 may have a generally tubular shape with an exterior surface that is substantially smooth. Thus, the shank 162 may receive the second member 152 in a manner that provides for relatively free motion of the second member 152 along the shank 162, in the proximal direction 114 as well as in the distal direction 116. As shown in FIG. 3, the shank 162 may be intermediate the first member distal end 166 and the first member proximal end 160 along the centerline 158 (i.e., the shank 162 is between the first member distal end 166 and the first member proximal end 160 along the dimension of the centerline 158 rather than being offset along a radial dimension 159a-b).

The flange 164 may have a flange proximal surface 172. The flange proximal surface 172 is oriented toward the first member proximal end 160 and thence toward the second member 152 when the second member 152 and the first member 150 are coupled together. A flange distal surface 174 of the flange 164 is oriented toward the first member distal end 166. The flange 164, as illustrated in FIG. 3, may have a greater exterior dimension than the shank 162. The flange proximal surface 172 may be intermediate the shank 162 and the flange distal surface 174 along the centerline 158, and the flange distal surface 174 may be intermediate the flange proximal surface 172 and the first member distal end 166 along the centerline 158.

The flange distal surface 174 may have a groove (not shown) that retains the distal O-ring 156. When the first member distal end 166 is in threaded engagement with an adjacent component, such as the inlet 132 or the outlet 134 of the additional valve 104, the distal O-ring 156 may be pressed against such a component. This pressure may deform the distal O-ring 156, for example, by spreading the distal O-ring 156 radially inward and outward, to form a seal that is substantially watertight.

The flange 164 may optionally have a generally polygonal shape that facilitates gripping and/or rotation of the flange 164 with a tool such as a wrench. Thus, the flange 164 may have a plurality of flat surfaces 176 that can easily be gripped by a wrench or other tool. In the exemplary embodiment shown, the flange 164 may have ten flat surfaces 176. However, in alternative embodiments, any number of flat surfaces may be provided. Also, in alternative embodiments (not illustrated), the flange 164 may have knurling that allows for hand tightening or rotation of the first member 150 such that rotation of the first member 150 may impart rotation to the second member 152.

Although the second member 152 may be gripped and/or rotated by hand to provide threaded interconnection of the coupling 110 with adjacent components, the ability to rotate the flange 164 with a tool may facilitate tightening the coupling 110 to a greater extent than would be achievable by hand. In one embodiment, all of the couplings 110 of a system, such as the manifold system 100 of FIG. 1, may be assembled with adjacent components as described above, and then a tool such a wrench may be used to tighten each of the couplings 110 to a predetermined tightness level that may help maintain threaded engagement during system operation and/or reduce the probability of leakage. Additionally or alternatively, a tool may be applied to the flange 164 in environments in which the access and/or leverage needed for hand-tightening is not available.

In addition, the flange 164 may have a first locking extension 178, which may protrude from the flange proximal surface 172 along the longitudinal dimension 112 (in this case, along or parallel with the centerline 158). Thus, in one embodiment, the first locking extension 178 may protrude along a direction parallel or substantially to the centerline 158. In this application, the term "parallel" signifies exactly parallel, while the term "substantially parallel" signifies in various different embodiments, plus or minus 5° of exactly parallel. In alternative embodiments, "substantially parallel" signifies plus or minus 3°, 7° or 15° of exactly parallel. The first locking extension 178 may protrude in the proximal direction 114. Further, the first locking extension 178 may be positioned at the periphery of the flange 164, and may thus be formed on one of the flat surfaces 176. The first locking extension 178 may be offset from the shank 162 so that a gap exists between the shank 162 and the first locking extension 178 along a radial dimension 159a-b. Alternatively, the first locking extension 178 may abut or be integral with the shank 162.

The first locking extension 178 may have a tapered shape that helps it to center itself within a recess during motion of the coupling 110 to the locked configuration, as will be described subsequently. If desired, a second locking extension 179, identical to the first locking extension 178, may also protrude from the flange proximal surface 172 along the longitudinal dimension 112, in the proximal direction 114. The first locking extension 178 and the second locking extension 179 may cooperate to register the second member 152 with the first member 150 in rotation, in the locked configuration, as will be described subsequently. However, this is optional; any number of locking extensions, including one, two, or more, may be used to provide for the locking interaction between the first member 150 and the second member 152.

The first member distal end 166 may be designed to be secured to an adjacent component, such as the inlet 132 and the outlet 134 of the main body 130, as shown in FIG. 1. Hence, the first member distal end 166 may have first member threads 180 that mate with the threads of such threaded fittings. In the exemplary application of FIG. 1, the threaded valve fittings 136 of the inlet 132 and the outlet 134 may have female threads; accordingly, the first member threads 180 may include male threads. Alternatively, the first member threads 180 may comprise female threads.

The second member 152 may include a second member proximal end 182 oriented in the proximal direction 114, and a distal surface 184 oriented in the distal direction 116 (i.e., toward the flange 164 when the second member 152 is coupled to the first member 150). The second member 152 may further have an exterior surface 186 oriented outward (i.e., away from the centerline 158), and a bore 188.

The second member proximal end 182 may be designed to be secured to an adjacent component, such as one of the threaded manifold fittings 124 of the pipe section 102 and/or the threaded conduit fitting 146 of the conduit 106. Thus, the second member proximal end 182 may have second member threads 190 that lead into the bore 188. The second member threads 190 may be female threads that mate with the male threads of the threaded manifold fittings 124 and/or the threaded conduit fitting 146. Alternatively, the second member threads 190 may comprise male threads.

The exterior surface 186 of the second member 152 may be designed to be easily gripped by hand and rotated. Thus, the exterior surface 186 may have knurling and/or other features that facilitate grasping of the second member 152 by hand. As shown in FIG. 3, the exterior surface 186 may have a plurality of ridges 192, 193. The ridges 192, 193 may be oriented longitudinally (i.e., parallel to the centerline 158 and the longitudinal dimension 112) and/or circumferentially, as shown.

The ridges 192 that are oriented longitudinally may facilitate hand rotation of the second member 152 about the centerline 158 (for example, to provide the threaded interconnection between the first member threads 180 and the threaded valve fitting 136 and/or the threaded interconnection between the second member threads 190 and the corresponding threaded manifold fitting 124 and/or the threaded conduit fitting 146). The ridges 193 that are oriented circumferentially may facilitate exertion of axial force on the second member 152 to move the second member 152 axially (along or substantially parallel to the centerline 158). Such motion may facilitate making the threaded interconnections described above, and may also facilitate moving the coupling 110 between the locked configuration and the unlocked configuration.

Furthermore, the distal surface 184 and/or the exterior surface 186 of the second member 152 may be shaped to define a plurality of recesses 194, which may be distributed about the periphery of the exterior surface 186, where the exterior surface 186 meets the distal surface 184. There may be at least one recess 194 for each of the locking extensions 178, 179 that protrude from the flange 164. Thus, in order to properly receive the locking extensions 178, 179 of the first member 150, including the first locking extension 178 and the second locking extension 179, the second member 152 may have at least two recesses 194 positioned, for example, at locations diametrically opposite to each other (i.e., positioned across the centerline 158 from each other along a radial dimension 158a-b).

Optionally, the second member 152 may have more recesses 194 than would be required to receive the locking extensions. This may enable the second member 152 to engage with the first member 150 at more than one or two relative orientations. For example, in the embodiment shown in FIG. 3, there may be ten recesses 194, which may be distributed about the periphery of the exterior surface 186, where the exterior surface 186 meets the distal surface 184. The first locking extension 178 and the second locking extension 179 of the first member 150 may be received within any two diametrically opposed recesses 194. Hence, the second member 152 may engage with the first member 150 at any of ten discrete orientations of the second member 152 relative to the first member 150. These discrete orientations may be arranged, for example, at 36° increments about the centerline 158. Thus, from one locked configuration, rotation of the second member 152 about the centerline 158 in either direction (clockwise or counterclockwise) along an angle of 36° relative to the first member 150 may result in a relative orientation at which the first member 150 and the second member 152 can also engage each other to provide another locked configuration.

As a result, a user may, with relative ease, rotate the second member 152, relative to the first member 150, to an orientation in which the second member 152 can be shifted along the first member 150 to the locked configuration. The second member 152 need only be rotated about the centerline 158, relative to the first member 150, through a maximum angle of 18° in order to align the second member 152 with the first member 150 for proper locking. The manner in which the coupling 110 is moved between the locked and unlocked configurations will be shown and described in connection with FIGS. 4 and 5.

The bore 188 of the second member 152 may further have a second member abutment 196, which may extend inward from the remainder of the bore 188, toward the centerline 158. The second member abutment 196 may have a tapered leading end 198, which may facilitate assembly of the first member 150 and the second member 152. The tapered leading end 198 may have a generally frustoconical shape that provides for a gradual reduction in the diameter of the bore 188 between the leading edge of the bore 188 and the portion of the bore 188 that is distal to the second member abutment 196.

More specifically, the coupling 110 may be assembled through the use of various steps. According to one method, the proximal O-ring 154 and the distal O-ring 156 may first be inserted into their respective grooves, (i.e., in the first member proximal end 160 and in the flange distal surface 174 of the flange 164). Then, the second member 152 may be moved in the distal direction 116, relative to the first member 150, until the second member 152 contacts the first member 150. The contact that first occurs may be between the tapered leading end 198 of the second member abutment 196 of the second member 152 and the tapered leading end 170 of the first member abutment 168 of the first member 150. The shapes of the tapered leading end 198 and the tapered leading end 170 may be complementary.

Further pressure urging the second member 152 toward the first member 150 may cause the first member abutment 168 and the second member abutment 196 to deflect. More specifically, the first member abutment 168 may be compressed radially inward (toward the centerline 158), temporarily reducing its exterior diameter. The second member abutment 196 may be pressed radially outward (away from the centerline 158), temporarily increasing its interior diameter. Sufficient deflection of the first member abutment 168 and the second member abutment 196 may enable the second member abutment 196 to move along the distal direction 116, beyond the first member abutment 168.

Once this occurs, the first member abutment 168 may no longer exert outward pressure on the second member abutment 196, and the second member abutment 196 may no longer exert inward pressure on the first member abutment 168. The first member abutment 168 and the second member abutment 196 may be relatively sized such that the deflection of the first member abutment 168 and the deflection of the second member abutment 196 are both elastic deflection, with little or no plastic deflection. Accordingly, the first member abutment 168 and the second member abutment 196 may both snap back to their original, substantially undeflected shapes once the second member abutment 196 has moved distally beyond the first member abutment 168. The resulting configuration is shown in FIG. 4.

Figure 4:
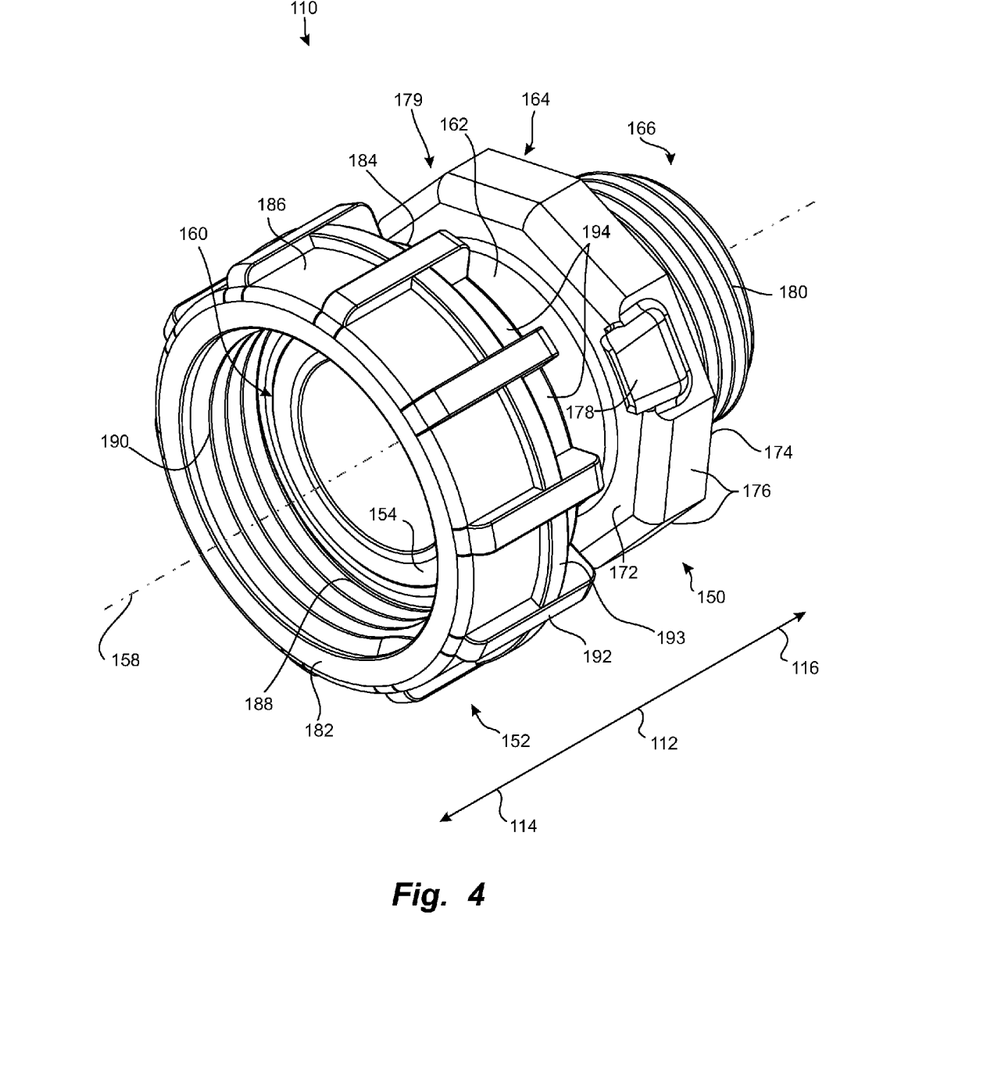
FIG. 4 is a side elevation, perspective view of the coupling of FIG. 3, in an unlocked configuration.

Referring to FIG. 4, a side elevation, perspective view illustrates the coupling 110 of FIG. 3 in an unlocked configuration. The coupling 110 is in a fully assembled condition after performance of the assembly steps described previously. Thus, the second member 152 has been moved in the distal direction 116, relative to the first member 150, until the second member abutment 196 (not shown in FIG. 4) of the second member 152 has moved beyond the first member abutment 168 (not shown in FIG. 4) of the first member 150. The second member abutment 196 of the second member 152 may encircle the shank 162 and may be trapped between the first member abutment 168 and the flange 164 of the first member 150. Thus, the second member 152 may slide along the shank 162 in the longitudinal dimension 112 with motion limited by abutment of the second member abutment 196 with the flange 164 and the first member abutment 168.

In FIG. 4, the coupling 110 is illustrated in the unlocked configuration. Thus, the second member 152 may rotate relatively freely on the shank 162, relative to the first member 150. Motion of the coupling 110 to the locked configuration may be accomplished relatively easily and may be done by hand (i.e., without the use of any tools).

For example, the coupling 110 may be moved from the unlocked configuration shown in FIG. 4 to a locked configuration (shown in FIG. 5) by first rotating the second member 152, relative to the first member 150, to an orientation in which each of the locking extensions (i.e., the first locking extension 178 and the second locking extension 179) of the first member 150 are aligned with one of the recesses 194 of the second member 152. Such an orientation is illustrated in FIG. 4; the first locking extension 178 is aligned with a first recess of the recesses 194.

Once the locking extensions have been aligned with recesses 194, the second member 152 may be moved toward the first member 150 (i.e., along the distal direction 116 relative to the first member 150). This motion may cause the locking extensions 178, 179 to enter the recesses 194. In the event there is minor misalignment between the locking extensions 178, 179 and the recesses 194, the tapered shape of the locking extensions 178, 179 (such as the tapered shape of the first locking extension 178) may cause the locking extensions 178, 179 to align themselves with the recesses 194 in response to this axial relative motion.

When the locking extensions 178, 179 enter the recesses 194, the coupling 110 may be considered to be in the locked configuration. This is because rotation of the second member 152 relative to the first member 150 may be blocked by abutment of the locking extensions 178, 179 with the adjacent walls of the recesses 194. Thus, rotation of the second member 152 about the centerline 158 may induce corresponding rotation of the first member 150 about the centerline 158.

In this locked configuration, further motion of the second member 152 along the distal direction 116 may cause the locking extensions (such as the first locking extension 178) to move further into the recesses 194. In the embodiment of FIG. 4, this motion may be limited by abutment of the distal surface 184 of the second member 152 with the flange proximal surface 172 of the flange 164 of the first member 150. More precisely, the second member 152 may move in the distal direction 116 until the distal surface 184 abuts the flange proximal surface 172. This configuration will be shown and described in connection with FIG. 5.

Figure 5:
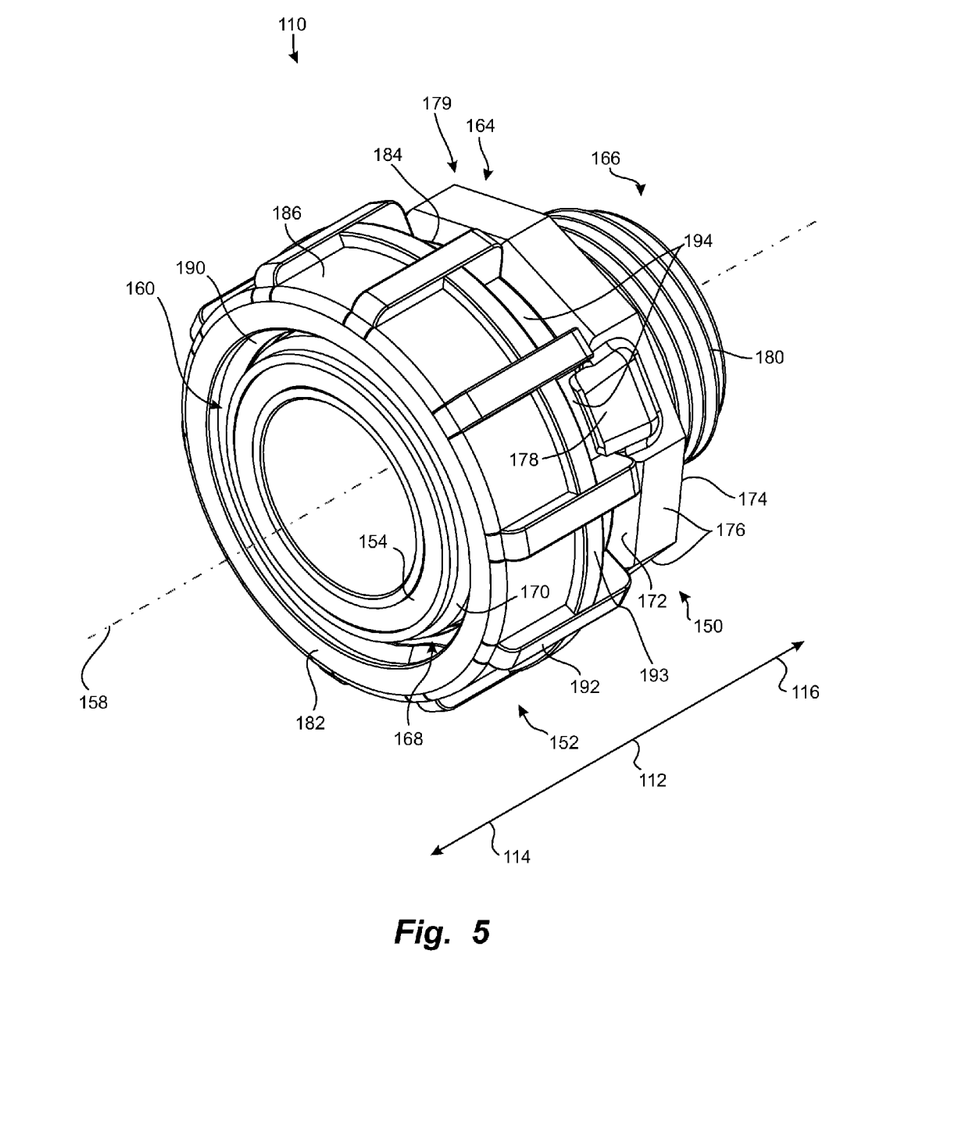
FIG. 5 is a side elevation, perspective view of the coupling of FIG. 3, in a locked configuration.

Referring to FIG. 5, a side elevation, perspective view illustrates the coupling of FIG. 3, in a locked configuration, with the second member 152 moved in the distal direction 116 to its furthest extent, relative to the first member 150. In this position, further motion of the second member 152 in the distal direction 116 may not be possible. Notably, in this position, the coupling 110 may still be in the locked configuration because the locking extensions 178, 179 may still reside within the recesses 194.

Thus, in the illustrated embodiment, applying force to the second member 152 in the distal direction 116 relative to the first member 150 does not cause the coupling 110 to shift back to the unlocked configuration. This may be a benefit because, if the second member 152 were able to move in the distal direction 116 out of locked configuration, a user may urge the second member 152 in the distal direction 116 in the process of causing the first member thread 180 to come into threaded engagement with the adjacent component (such as the inlet 132 or the outlet 134 of the additional valve 104). This axial force may accompany rotation of the second member 152. If exertion of such axial force caused the second member 152 to move to an unlocked configuration, the user might find that he or she is no longer able to rotate the first member 150 via rotation of the second member 152. Thus, he or she may have to stop rotating the second member 152 until the coupling 110 has been positioned once again into the locked configuration.

The embodiment of FIG. 5 avoids such a necessity; the user may rotate the second member 152 and urge the second member 152 to move in the distal direction 116 until the first member thread 180 has come to full threaded engagement with the adjacent component. This may be done without having to move the coupling 110 back to the locked configuration after unintended motion into the unlocked configuration. Thus, when the second member 152 is in the locked configuration, applying pressure to the second member 152 to move the second member 152 closer to the flange 144 does not disengage the second member 152 from the locked configuration. When the user wishes to move the coupling 110 back to the unlocked configuration, he or she may move the second member 152 in the proximal direction 114 relative to the first member 150 until the locking extensions 178, 179 have been withdrawn from the recesses 194. The second member 152 may then be able to rotate about the centerline 158 independently of rotation of the first member 150 about the centerline 158.

The coupling 110 of FIGS. 1-5 represents only one of many possible embodiments of the invention. The principles of the present disclosure may be applied in various ways by a person of skill in the art to generate a wide variety of alternative embodiments. One such embodiment will be shown and described in connection with FIG. 6.

Figure 6:
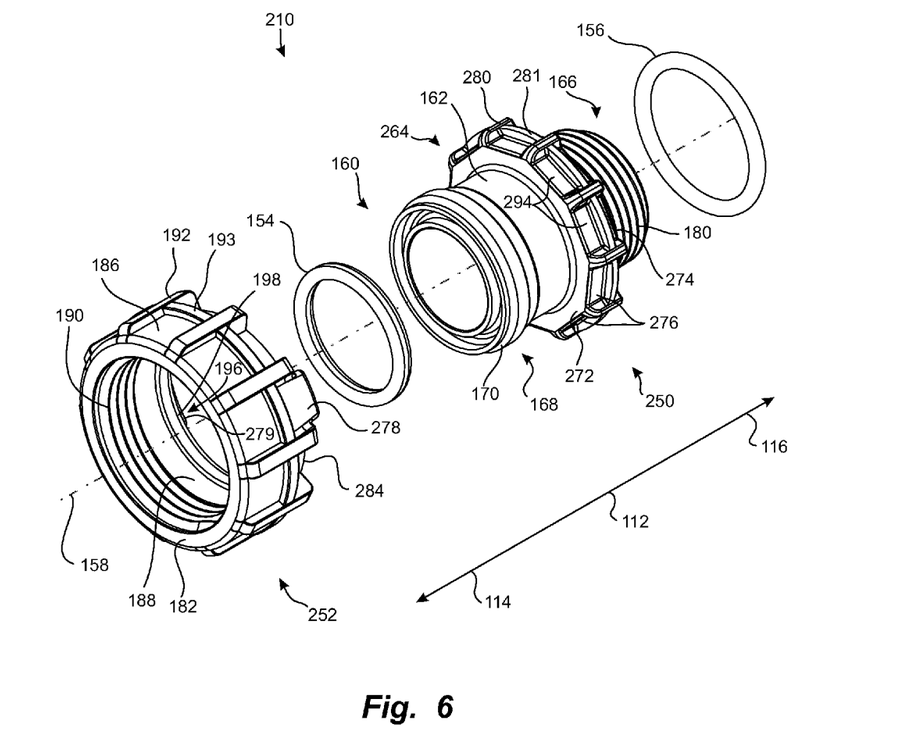
FIG. 6 is a side elevation, exploded perspective view of a coupling according to one alternative embodiment.

Referring to FIG. 6, a side elevation, exploded perspective view illustrates a coupling 210 according to one alternative embodiment. Components of the coupling 210 that are the same or similar to those of FIGS. 1-5 have been indicated with the same reference numerals as those used in FIGS. 1-5.

Like the coupling 110, the coupling 210 may have a first member 250, a second member 252, a proximal O-ring 154, and a distal O-ring 156. The first member 250 may have a first member proximal end 160, a shank 162, and a first member distal end 166 like those of the first member 150 of the previous embodiment. However, the first member 250 may also have a flange 264 that differs from the flange 164 of the previous embodiment. The flange 264 may have a flange proximal surface 272 oriented in the proximal direction 114 (i.e., toward the second member 252) and a flange distal surface 274 oriented toward the first member distal end 166. The flange 264 may have a plurality of flat surfaces 276 at its periphery; the flat surfaces 276 may facilitate the use of a tool to rotate the first member 250.

The flange 264 may differ from the flange 164 in that the flange 264 may not have locking extensions 178, 179. Rather, the flange 264 may have a plurality of recesses 294, each of which may exist on one of the flat surfaces 276. The flat surfaces 276, and thence the recesses 294, may be separated from each other by ridges 280, 281, which may include longitudinal and circumferential ridges like the ridges 192, 193 of the second member 252. The ridges 280 may also facilitate rotation and/or translation of the flange 264 along the longitudinal dimension 112 by hand.

The second member 252 may have a second member proximal end 182, a second member distal surface 284, an exterior surface 186, a bore 188 and a second member abutment 196 comprising a tapered leading end 198. These features may generally be like those of the second member 152 of the previous embodiment. However, the second member 252 may also have a first locking extension 278 and a second locking extension 279, which may protrude from the second member distal surface 284 along the longitudinal dimension 112, in the distal direction 116 (i.e., toward the flange 264).

The coupling 210 may be moved from an unlocked configuration to a locked configuration in a manner similar to that of the coupling 110. More specifically, when the second member 252 is moved along the distal direction 116, relative to the first member 250, the first locking extension 278 and the second locking extension 279 may be received in the recesses 294 of the flange 264. This engagement may cause rotation of the first member 250, about the centerline 158, to be linked to that of the second member 252, as in the previous embodiment.

From the locked configuration, further motion of the second member 252, relative to the first member 250, in the distal direction 116 may not remove or disengage the coupling 210 from the locked configuration. Rather, the coupling 210 may be moved back to the unlocked configuration by moving the second member 252 in the proximal direction 114, relative to the first member 250, until the first locking extension 278 and the second locking extension 279 have been withdrawn from the recesses 294 of the flange 264.

The disclosed subject matter may be embodied in various ways other than those specifically described above. For example, in the embodiment illustrated in FIGS. 1-5, the first member 150 may include knurling such that rotation of the first member 150 by hand, when the first and second members 150, 152 are interlocked, would impart rotation to the second member 152. The same is also true of the embodiment illustrated in FIG. 6. Accordingly, in the claims, either the first member 150, 250 and/or the second member 152, 252 may include knurling that enables hand rotation unless specifically excluded by claim language.

Furthermore, the first member 150, 250 and second member 152, 252 may each include a combination of recesses and locking extensions (e.g., the first member may include a first locking extension that engages a recess on the second member and the second member may include a second locking extension that engages a recess on the first member).

Also, as shown in the figures, the flange proximal surface 172, 272 and the second member distal surface 184, 284 are or comprise components that are substantially perpendicular to the centerline 158. In alternative embodiments, the flange proximal surface 172, 272 and the second member distal surface 184, 284 may be positioned at alternative angles and still enable engagement between one or more locking extensions 178, 179, 278, 279 and recesses 194, 294.

In addition, in one embodiment, the first member 150, 250 may be referred to as a base member, and the second member 152, 252 may be referred to as a grip member.

It should also be noted that, in an alternative embodiment, the shank 162 could comprise a portion of the second member 152, 252, and the first member 150, 250 could comprise a bore 188 shaped to receive the shank 162.

The terms "proximal" and "distal," as used in this application, do not denote an orientation with respect to fluid flow, or anticipated fluid flow, within the coupling or components attached to the coupling. Instead terms "proximal" and "distal" are utilized to identify relative orientation and positioning of components and features within the coupling.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art and the generic principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A manifold system comprising:
 a pipe section comprising a plurality of threaded manifold fittings; and
 at least one coupling, each of the at least one coupling having a centerline and defining a fluid flow passageway, wherein each of the at least one coupling comprises:
  a base member shaped to define:
   a base member distal end comprising base member threads;
   a base member proximal end;
   a shank intermediate the base member distal end and the base member proximal end; and
   a flange intermediate the base member distal end and the shank, the flange having a greater exterior dimension than the shank, wherein the flange comprises:
    a flange proximal surface;
    a flange distal surface, the flange proximal surface being intermediate the shank and the flange distal surface, the flange distal surface being intermediate the flange proximal surface and the base member distal end; and a first locking extension that protrudes from the flange proximal surface; and a grip member shaped to define:

a bore sized to receive the shank such that the grip member is slidable axially along the shank of the base member between a locked configuration in which rotation of the grip member about the centerline induces rotation of the base member about the centerline, and an unlocked configuration in which the grip member is rotatable about the centerline independently of the rotation of the base member;

a grip member proximal end comprising grip member threads configured to engage one of the plurality of threaded manifold fittings; and a grip member distal end comprising a grip member distal surface, the grip member distal end being disposed intermediate a grip member proximal end and the flange proximal surface when the shank is received within the bore, wherein the grip member distal surface is shaped to define a first recess that receives the first locking extension in the locked configuration, and not in the unlocked configuration.

2. The manifold system of claim 1, wherein, for each of the at least one coupling, from the locked configuration, further motion of the grip member toward the base member distal end along the shank causes the grip member distal surface to contact the flange such that the flange obstructs further motion of the grip member toward the base member distal end.

3. The manifold system of claim 1, wherein the flange comprises a peripheral shape that is larger than the bore such that an entirety of the base member is unable to pass through the bore.

4. The manifold system of claim 1, further comprising at least one valve, each of which comprises a first threaded valve fitting defining a fluid inlet, and wherein, for each of the at least one coupling, the base member threads are configured to engage the first valve fitting of one of the at least one valve.

5. The manifold system of claim 4, wherein each of the at least one valve further comprises a second threaded valve fitting defining a fluid outlet, and wherein, for each of the at least one coupling, the base member threads are further configured to engage the second valve fitting of one of the at least one valve.

6. The manifold system of claim 1, wherein the flange of each of the at least one coupling comprises a polygonal peripheral shape comprising a plurality of flat surfaces; and wherein the grip member of each of the at least one coupling is further shaped to define a knurled exterior surface to facilitate the rotation of the grip member by hand.

7. The manifold system of claim 1, wherein the flange of each of the at least one coupling further comprises a second locking extension that protrudes from the flange proximal surface;

wherein the grip member distal surface of the grip member distal end of each of the at least one coupling is further shaped to define a second recess and a plurality of additional recesses; and wherein the first locking extension and the second locking extension are each insertable into any of the first recess, the second recess, and the plurality of additional recesses such that the grip member is movable along the shank into the locked configuration in at least three discrete orientations of the grip member relative to the base member.

8. The manifold system of claim 1, wherein the base member threads of each of the at least one coupling comprise male threads shaped to engage a female threaded fitting; and wherein the grip member threads of each of the at least one coupling comprises female threads shaped to engage a male threaded fitting.

9. The manifold system of claim 1, wherein the base member proximal end of each of the at least one coupling comprises a base member abutment extending outward from the centerline;

wherein the bore of each of the at least one coupling comprises a grip member abutment extending toward the centerline;

wherein, for each of the at least one coupling, when the shank is received within the bore, the base member abutment contacts the grip member abutment in response to proximal motion of the grip member along the shank to restrict withdrawal of the shank from the bore; and wherein, for each of the at least one coupling, at least one of the base member abutment and the grip member abutment comprises a tapered leading end that facilitates passage of the base member abutment through the grip member abutment during distal motion of the grip member relative to the base member to insert the shank into the bore.

10. A method for assembling a coupling, the coupling defining a fluid passageway and having a centerline, the coupling comprising a first member shaped to define a first member distal end comprising first member threads, a first member proximal end, a shank intermediate the first member proximal end and the first member distal end, and a flange having a greater exterior dimension than the shank, the flange being intermediate the shank and the first member distal end, the flange comprising a flange proximal surface and a flange distal surface, the flange proximal surface being intermediate the shank and the flange distal surface, the flange distal surface being intermediate the flange proximal surface and the first member distal end, a first locking extension that protrudes from the flange proximal surface, wherein the coupling comprises a second member shaped to define a bore sized to receive the shank, a second member distal end comprising a second member distal surface, and a second member proximal end comprising second member threads, wherein the distal second member surface is shaped to define a first recess shaped to receive the first locking extension, the method comprising:

aligning the first member threads with a first threaded fitting;

sliding the second member axially along the shank from an unlocked configuration in which the second member is rotatable about the centerline independently of rotation of the first member, to a locked configuration;

wherein sliding the second member to the locked configuration comprises inserting the first locking extension into the first recess, wherein, when the second member is in the locked configuration, applying pressure to the second member to move the second member closer to the flange does not disengage the second member from the locked configuration;

in the locked configuration, rotating the second member by hand; and in response to rotation of the second member, rotating the first member via engagement of the first locking extension with the first recess to cause the first member threads to engage the first threaded fitting.

11. The method of claim 10, further comprising:

aligning the second member with a second threaded fitting;

sliding the second member along the shank from the locked configuration to the unlocked configuration;

further rotating the second member by hand; and in response to further rotation of the second member, causing the second member threads to engage the second threaded fitting.

12. The method of claim 11, wherein the first threaded fitting is on a pipe section of a manifold system and the second threaded fitting defines a fluid inlet of a valve;

wherein causing the first member threads to engage the first threaded fitting comprises securing the first coupling to the pipe section; and wherein causing the second member threads to engage the second threaded fitting comprises securing the first coupling to the valve.

13. A coupling defining a fluid flow passageway and having a centerline, the coupling comprising:

a first member shaped to define:
  a first member distal end comprising first member threads;
  a first member proximal end;
  a shank intermediate the first member distal end and the first member proximal end; and
  a flange intermediate the first member distal end and the shank, the flange having a greater exterior dimension than the shank, wherein the flange comprises:
    a flange proximal surface;
    a flange distal surface, the flange proximal surface being intermediate the shank and the flange distal surface, the flange distal surface being intermediate the flange proximal surface and the first member distal end; and
    a first locking extension or recess disposed on the flange proximal surface; and a second member shaped to define:
  a bore sized to receive the shank such that the second member is slidable axially along the shank of the first member between a locked configuration in which rotation of the second member about the centerline induces rotation of the first member about the centerline, and an unlocked configuration in which the second member is rotatable about the centerline independently of the rotation of the first member;
  a second member proximal end comprising second member threads configured to engage a threaded manifold fitting; and
  a second member distal end comprising a second member distal surface, the second member distal end being disposed intermediate a second member proximal end and the flange proximal surface when the shank is received within the bore, wherein the second member distal surface is shaped to define a second locking extension or recess shaped to engage the first locking extension or recess in the locked configuration and not in the unlocked configuration.

14. The coupling of claim 13, wherein the flange comprises a polygonal peripheral shape comprising a plurality of flat surfaces; and wherein the second member is further shaped to define a knurled exterior surface to facilitate the rotation of the second member by hand.

15. The coupling of claim 13, wherein the flange further comprises a third locking extension or recess disposed on the flange proximal surface, and wherein the second member distal surface is further shaped to define a fourth locking extension or recess that engages the third locking extension or recess in the locked configuration.

16. The coupling of claim 15, wherein the second member distal surface is further shaped to define a plurality of additional locking extensions or recesses, and wherein the first locking extension or recess and the third locking extension or recess are shaped to engage any of the second locking extension or recess, the fourth locking extension or recess or any of the plurality of additional locking extensions or recesses such that the second member is movable along the shank into the locked configuration in at least three discrete orientations of the second member relative to the first member.

17. The coupling of claim 13, wherein the first member threads comprise male threads shaped to engage a female threaded fitting; and wherein the second member threads comprises female threads shaped to engage a male threaded fitting.

18. The coupling of claim 13, wherein the first member proximal end comprises a first member abutment extending outward from the centerline;

wherein the bore comprises a second member abutment extending toward the centerline; and wherein, when the shank is received within the bore, the first member abutment contacts the second member abutment in response to proximal motion of the second member along the shank to restrict withdrawal of the shank from the bore.

19. The coupling of claim 18, wherein at least one of the first member abutment and the second member abutment comprises a tapered leading end that facilitates passage of the first member abutment through the second member abutment during distal motion of the second member relative to the first member to insert the shank into the bore.

20. The coupling of claim 13, wherein the flange is further shaped to define a knurled exterior surface to facilitate the rotation of the second member by hand.

* * * * *